US012670078B2

(12) United States Patent
    Kim

(10) Patent No.: US 12,670,078 B2
(45) Date of Patent: Jun. 30, 2026

(54) STORAGE DEVICE INCLUDING TEST STORAGE BLOCK AND COMPUTING SYSTEM

(71) Applicant: SK hynix Inc., Icheon-si (KR)

(72) Inventor: Chang Han Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 24 days.

(21) Appl. No.: 18/828,904

(22) Filed: Sep. 9, 2024

(65) Prior Publication Data

US 2025/0348392 A1     Nov. 13, 2025

(30) Foreign Application Priority Data

May 8, 2024     (KR) ........................ 10-2024-0060228

(51) Int. Cl.
    *G06F 11/22* (2006.01)
    *G06F 11/263* (2006.01)
    *G06F 13/16* (2006.01)

(52) U.S. Cl.
    CPC ........ *G06F 11/2273* (2013.01); *G06F 11/263* (2013.01); *G06F 13/1673* (2013.01)

(58) Field of Classification Search
    CPC .............. G06F 11/2273; G06F 11/263; G06F 13/1673; G06F 3/0607; G06F 3/064; G06F 3/0658; G06F 3/0604; G06F 3/0614; G06F 3/0656; G06F 3/0659; G06F 2212/1016; G06F 2212/1032

USPC ......................................................... 714/763
See application file for complete search history.

(56) References Cited

U.S. PATENT DOCUMENTS

| | | | | |
|---|---|---|---|---|
| 10,445,229 B1 * | 10/2019 | Kuzmin | ................. | G06F 3/061 |
| 2018/0150242 A1 * | 5/2018 | Yi | .......................... | G06F 3/0656 |
| 2019/0146712 A1 * | 5/2019 | Lee | ..................... | G06F 12/0246 |
| | | | | 711/103 |
| 2021/0103518 A1 * | 4/2021 | Ju | ........................ | G06F 12/0246 |
| 2022/0276783 A1 * | 9/2022 | Kang | .................... | G06F 3/0616 |
| 2023/0075329 A1 * | 3/2023 | Surianarayanan | .... | G06F 3/0653 |
| 2023/0076985 A1 * | 3/2023 | Surianarayanan | .... | G06F 3/0604 |
| 2023/0134639 A1 * | 5/2023 | Yoo | ........................ | G06F 3/0644 |
| | | | | 711/154 |
| 2023/0143267 A1 * | 5/2023 | Shin | ..................... | G06F 12/0238 |
| 2024/0273068 A1 * | 8/2024 | Park | ..................... | G06F 3/0679 |
| 2025/0021264 A1 * | 1/2025 | Choi | ..................... | G06F 3/0619 |
| 2025/0077091 A1 * | 3/2025 | Park | ...................... | G06F 3/0679 |

FOREIGN PATENT DOCUMENTS

KR      10-2023-0064849 A      5/2023

* cited by examiner

*Primary Examiner* — Albert Decady
*Assistant Examiner* — Osman M Alshack

(57)     ABSTRACT

In an embodiment of the disclosed technology, the operating performance of a storage device is measured through allocation of a test storage block of a size different from a preset size of a normal storage block of a memory, and whether to change the size of a normal storage block is determined. Therefore, it is possible to improve the operating performance of the storage device and improve the data processing performance of an external device which performs data processing using the storage device.

18 Claims, 12 Drawing Sheets

STORAGE DEVICE INCLUDING TEST STORAGE BLOCK AND COMPUTING SYSTEM

CROSS-REFERENCE TO RELATED APPLICATION

The present application claims priority under 35 U.S.C. § 119 (a) to Korean Patent Application No. 10-2024-0060228 filed in the Korean Intellectual Property Office on May 8, 2024, which is incorporated herein by reference in its entirety.

BACKGROUND

1. Technical Field

Various embodiments of the disclosed technology generally relate to a storage device and a computing system.

2. Related Art

A storage device may include at least one memory that stores data. The storage device may include a controller that controls the operation of the at least one memory. The controller may control an operation of writing data to the memory or reading data written to the memory. The controller may control the operation of the memory according to a command received from an external device.

The external device may be a host device. The host device may access the memory through the controller included in the storage device, and may perform data processing using the memory. Depending on operational delays caused by the storage device, the performance of data processing by the host device may deteriorate.

SUMMARY

Various embodiments of the disclosed technology are directed to providing measures in which an external device performing data processing using a storage device may efficiently use the storage device and the storage device may support improvement of data processing performance by the external device.

In an embodiment, a storage device may include: at least one memory including a plurality of storage blocks; and a controller configured to allocate a first normal storage block of a first size in response to a first allocation request from a host device, allocate a test storage block of a second size different from the first size in response to a second allocation request from the host device, and allocate a second normal storage block of a third size, which is the same as the first size or the second size, in response to a third allocation request from the host device.

In an embodiment, a storage device may include: at least one memory including a plurality of storage blocks; and a controller configured to allocate a first normal storage block of a first size in response to a first allocation request from a host device, and allocate a test storage block of a second size different from the first size in response to a second allocation request from the host device, the test storage block being excluded from a background operation.

In an embodiment, a computing system may include: a storage device including a plurality of storage blocks; and a host device configured to transmit, to the storage device, a first allocation request requesting allocation of a normal storage block of a first size for writing of user data, and transmit, to the storage device, a second allocation request requesting allocation of a test storage block of a second size different from the first size for writing of dummy data.

According to the embodiments of the disclosed technology, an external device using a storage device may perform data processing by efficiently increasing the operating performance of the storage device, thereby improving the operating performance of the storage device and data processing performance by the external device.

BRIEF DESCRIPTION OF THE DRAWINGS

FIG. 1 is a diagram illustrating a schematic configuration of a storage device according to an embodiment of the disclosure.

FIG. 3 is a diagram illustrating management of a test storage block in a storage device according to an embodiment of the disclosure.

FIG. 5 is a diagram illustrating reading of data of a test storage block in a storage device according to an embodiment of the disclosure.

FIG. 7 is a diagram illustrating writing of dummy data for a test in a storage device according to an embodiment of the disclosure.

DETAILED DESCRIPTION

Figure 2:
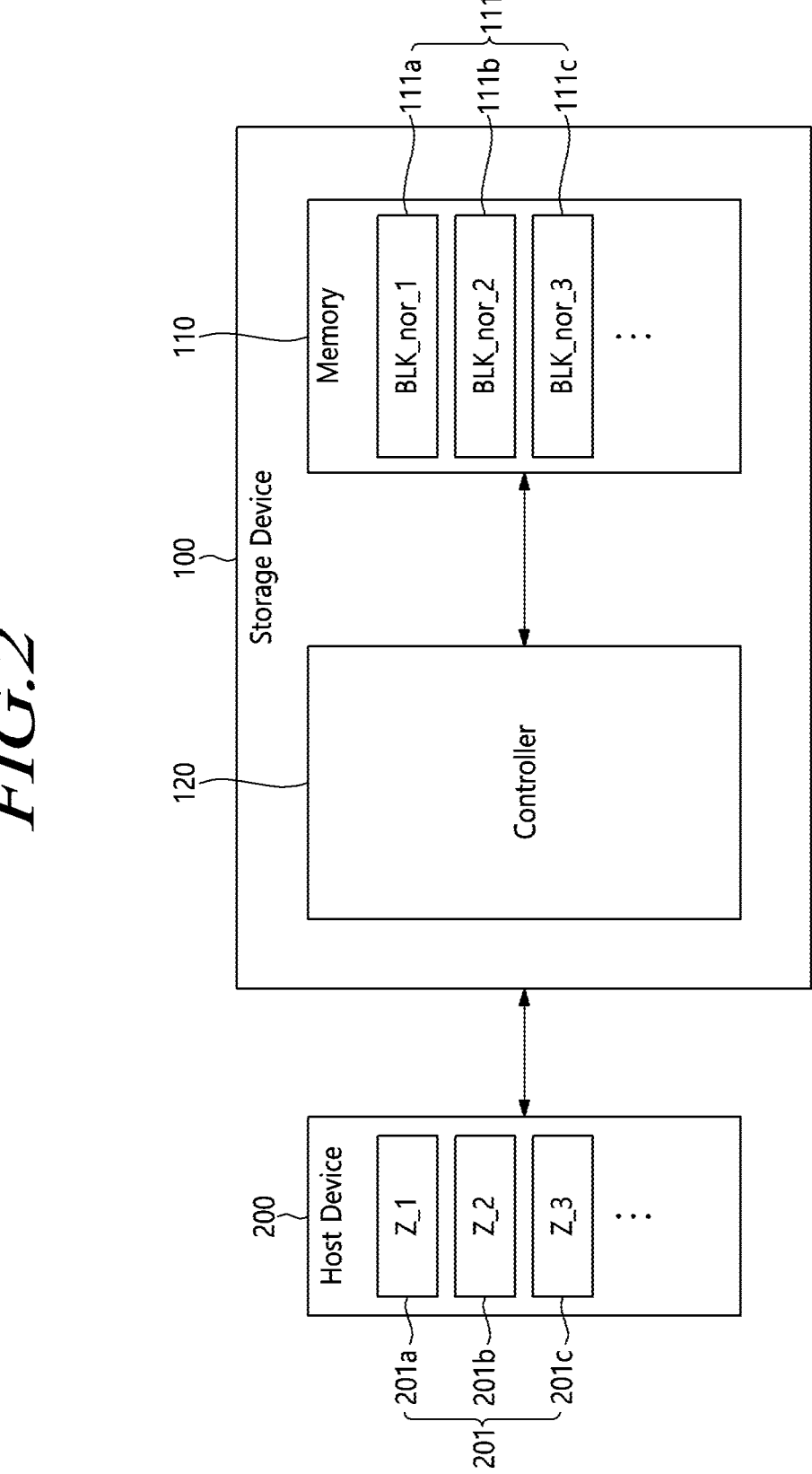
FIG. 2 is a diagram illustrating management of a normal storage block in a storage device according to an embodiment of the disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings. Further, in the following description of examples or embodiments of the present disclosure, detailed descriptions of well-known functions and components incorporated herein will be omitted when it is determined that the description may make the subject matter in some embodiments of the present disclosure more unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, or manufacturing methods, these terms may be used to describe non-consecutive or non-sequential processes or operations unless the term "directly" or "immediately" is used together.

In addition, when any dimensions, relative sizes etc. are mentioned, it should be considered that numerical values for elements or features, or corresponding information (e.g., level, range, etc.) include a tolerance or error margin that may be caused by various factors (e.g., process factors, internal or external impact, noise, etc.) even when a relevant description is not specified. Further, the term "may" fully encompasses all the meanings of the term "can".

Hereinafter, various embodiments of the present disclosure will be described in detail with reference to accompanying drawings.

Figure 1:
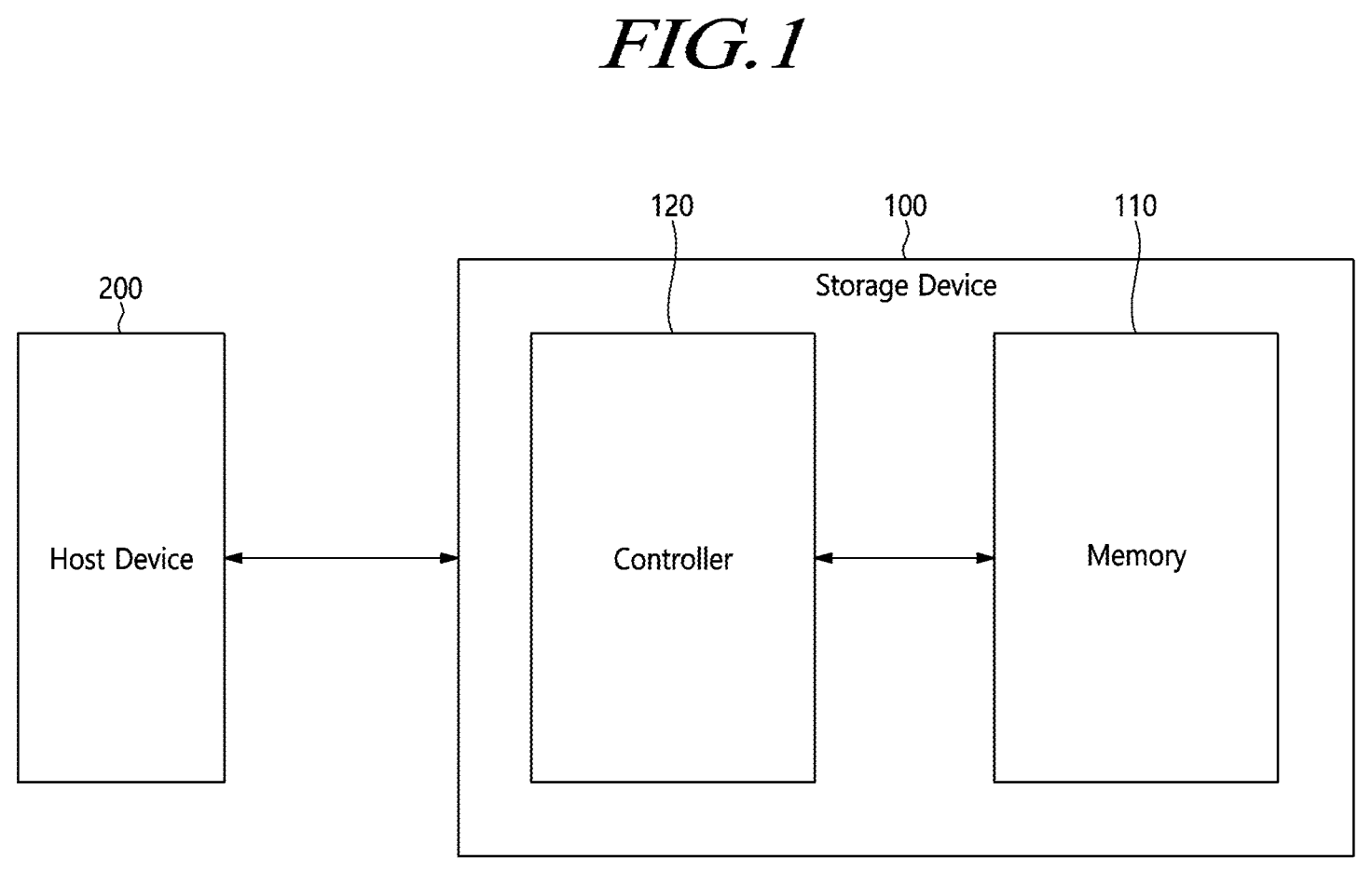

FIG. 1 is a diagram illustrating a schematic configuration of a storage device according to an embodiment of the disclosure.

Referring to FIG. 1, a storage device 100 may include at least one memory 110. The storage device 100 may include a controller 120 that controls the operation of the memory 110.

The memory 110 may be, for example, a volatile memory such as a DRAM, an SDRAM, a DDR SDRAM and an LPDDR SDRAM, but embodiments of the disclosed technology are not limited thereto. For example, the memory 110 may be a nonvolatile memory such as a NAND flash memory, a 3D NAND flash memory and a NOR flash memory, and in addition one part of the memory 110 included in the storage device 100 may be a volatile memory, and the other part may be a nonvolatile memory.

The memory 110 may be one of various types of memories such as a resistive RAM, a phase change memory, a magnetoresistive memory, a ferroelectric memory and a spin transfer torque random access memory. The memory 110 may be a processing-in-memory, which includes a calculation function or a data processing function. The memory 110 may include a plurality of storage blocks.

Each of the plurality of storage blocks may include a plurality of memory cells.

The controller 120 may receive a command from the outside, and may control the operation of the memory 110 on the basis of the received command. The controller 120 may also control the operation of the memory 110 on the basis of an internally generated command.

For example, the controller 120 may control an operation of writing data to the memory 110. The controller 120 may control an operation of reading data written to the memory 110.

Depending on the type of the memory 110, the controller 120 may control a data preservation operation (e.g., a refresh operation or a patrol scrub operation) or an erase operation on data written to the memory 110.

The controller 120 may control the operation of the memory 110 on the basis of a command received from an external host device 200. The controller 120 may provide the host device 200 with a processing result according to an operation corresponding to the command. The controller 120 may transmit data or a response signal to the host device 200.

In order to maintain and improve the operating performance of the storage device 100, the controller 120 may perform a background operation associated with the memory 110 on the basis of an external command received from the host device 200, or on the basis of an internal command. The background operation may include, for example, at least one among garbage collection, wear leveling, read reclaim and bad block management operations.

For example, the host device 200 may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a telematics network, an RFID (radio frequency identification) device, a mobility device (e.g., a vehicle, a robot or a drone) capable of traveling under human control or autonomous driving, or the like. Alternatively, the host device 200 may be a virtual/augmented reality device that provides a 2D or 3D virtual reality image or augmented reality image. In addition, the host device 200 may be any one of various electronic devices, each of which requires a storage device 100 capable of storing data.

In the present specification, the storage device 100 and the host device 200 may be collectively referred to as a computing system.

The host device 200 may include at least one operating system. The operating system may manage and control overall functions and operations of the host device 200, and may control interoperations between the host device 200 and the storage device 100. The operating system may be classified into a general operating system and a mobile operating system depending on the mobility of the host device 200.

The controller 120 and the host device 200 may be devices that are separated from each other or that are implemented by being integrated as one device, or some components or functions of the controller 120 may be implemented by being included in the host device 200. Hereunder, for the sake of convenience in explanation, it will be described as an example that the controller 120 and the host device 200 are devices that are separated from each other.

The controller 120 may allocate a storage block of the memory 110 according to a request from the host device 200. The controller 120 may control an operation of writing data to the storage block allocated according to the request from the host device 200 or reading data written to the allocated storage block.

For example, the controller 120 may manage the storage block allocated to the host device 200 while mapping and managing a logical address received from the host device 200 and a physical address of the memory 110. In order to efficiently manage data to be stored in the storage device 100, the host device 200 may set a zone of a predetermined size, and may manage the data by units of zone. The storage device 100 may allocate a storage block of a size corresponding to the zone to the host device 200, and may provide the storage block to be used for data processing of the host device 200.

FIG. 2 is a diagram illustrating management of a normal storage block in a storage device according to an embodiment of the disclosure.

Referring to FIG. 2, in order to manage data, a host device 200 may set and manage a plurality of normal zones 201. The normal zone 201 may have a predetermined size. For example, a first normal zone 201a, a second normal zone 201b and a third normal zone 201c set by the host device 200 may have the same size.

Some of the plurality of normal zones 201 may have a different size. The host device 200 may manage data by setting a normal zone 201 having a first size and a normal zone 201 having a second size different from the first size.

The host device 200 may set a zone for managing data, and may request the storage device 100 to allocate a storage block of the memory 110 corresponding to the zone.

The controller 120 of the storage device 100 may allocate a normal storage block 111 in response to the allocation request of the host device 200. The memory 110 of the storage device 100 may include a plurality of storage blocks. The controller 120 may allocate the plurality of storage blocks included in the memory 110 as the normal storage block 111 corresponding to the size of the normal zone 201 set by the host device 200.

For example, the controller 120 may allocate a first normal storage block 111a, a second normal storage block 111b and a third normal storage block 111c corresponding to the first normal zone 201a, the second normal zone 201b and the third normal zone 201c, respectively, of the host device 200.

The sizes of the first normal storage block 111a, the second normal storage block 111b and the third normal storage block 111c may be constant.

For example, when processing and managing the data of the first normal zone 201a, the host device 200 may transmit a corresponding command to the storage device 100. According to the command received from the host device 200, the controller 120 of the storage device 100 may perform an operation of writing data to the first normal storage block 111a corresponding to the first normal zone 201a or reading data written to the first normal storage block 111a.

The host device 200 may manage the normal zone 201 and perform data processing while variously setting the size of the normal zone 201 or changing the set size of the normal zone 201. When changing the size of the normal zone 201, the host device 200 may derive, through a test, a size of the normal zone 201 capable of improving data processing performance, and the storage device 100 may support the test.

Figure 3:
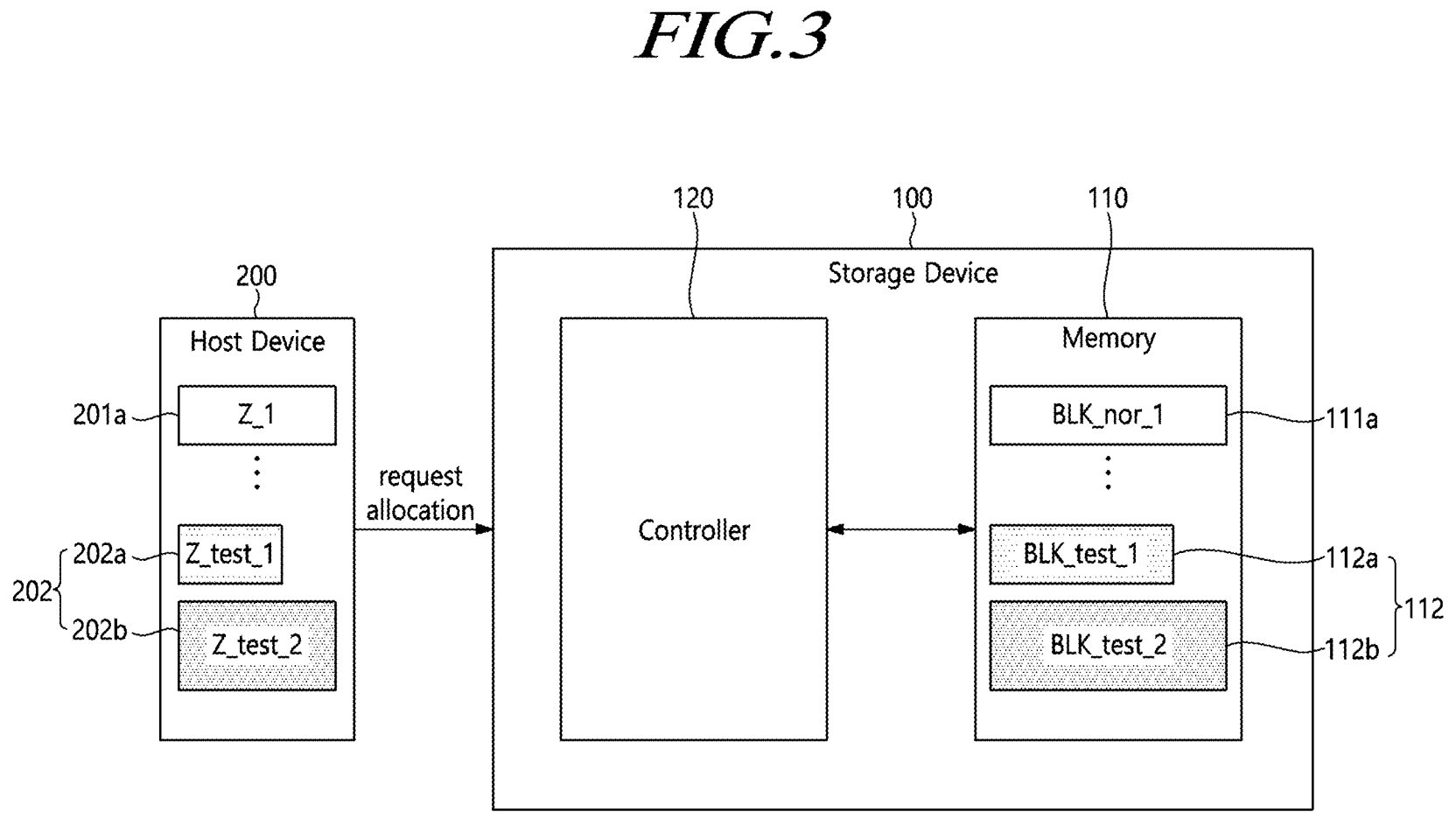

FIG. 3 is a diagram illustrating management of a test storage block in a storage device according to an embodiment of the disclosure.

Referring to FIG. 3, a host device 200 may manage data by setting a first normal zone 201a. For example, the first normal zone 201a may have a first size. The host device 200 may request a storage device 100 to allocate a storage block corresponding to the first normal zone 201a.

The controller 120 of the storage device 100 may allocate a first normal storage block 111a corresponding to the first normal zone 201a. The size of the first normal storage block 111a may correspond to the first size of the first normal zone 201a. According to a command of the host device 200, the controller 120 may control an operation of writing data to the first normal storage block 111a or reading data written to the first normal storage block 111a.

In order to improve data processing performance or for convenience in management, the host device 200 may change the size of a set zone. Before changing the size of a zone, the host device 200 may set a test zone 202 and may determine the size of the zone to be changed using the test zone 202.

For example, the host device 200 may set a first test zone 202a. The first test zone 202a may have a second size different from the first size of the first normal zone 201a. For example, the second size may be smaller than the first size.

Alternatively, the host device 200 may set a second test zone 202b. The second test zone 202b may have a third size different from the first size of the first normal zone 201a. For example, the third size may be larger than the first size.

The host device 200 may perform a test using one test zone 202 or may perform a test using at least two test zones 202.

After setting the test zone 202, the host device 200 may request the storage device 100 to allocate a storage block corresponding to the test zone 202.

According to the allocation request of the host device 200, the controller 120 of the storage device 100 may allocate a test storage block 112 corresponding to the test zone 202. For example, the controller 120 may allocate a first test storage block 112a corresponding to the first test zone 202a having the second size. The controller 120 may allocate a second test storage block 112b corresponding to the second test zone 202b having the third size.

The first test storage block 112a and the second test storage block 112b may be allocated during separate test periods. The first test storage block 112a and the second test storage block 112b may be sequentially allocated during a period in which a test is in progress. Alternatively, the first test storage block 112a and the second test storage block 112b may be allocated within the same test period.

After allocating the test storage block 112, the controller 120 may maintain the allocation state of the test storage block 112 until a deallocation request by the host device 200 is received. The controller 120 may fix a physical location corresponding to the test storage block 112 until the test storage block 112 is deallocated.

For example, the controller 120 may maintain a region allocated as the test storage block 112 in the memory 110 until the deallocation request for the test storage block 112 is received. Since the test storage block 112 is a region for a test, the controller 120 may maintain the allocation state of the test storage block 112 until the deallocation request by the host device 200 is received, without changing the physical location of the test storage block 112 or the location of data stored in the test storage block 112.

The host device 200 may measure the operating performance of the storage device 100 while writing predetermined data to the allocated test storage block 112 or reading data written to the allocated test storage block 112. Through performance measurement using the test storage block 112 corresponding to the test zone 202 with a size that is different from the size of a normal zone 201, the host device 200 may determine whether to change the size of a normal zone 201.

While embodiments of the disclosure describe an allocated storage block according to a zone set by the host device 200, other embodiments may feature a host device 200 that does not set a zone and that changes the size of a storage block set.

The host device 200 may measure the operating performance of the storage device 100 through the test storage block 112. The storage device 100 may maintain the allocation state of the test storage block 112 while a test is in progress, and may adjust an internal operation of the storage device 100 according to the allocation state of the test storage block 112.

Figure 4:
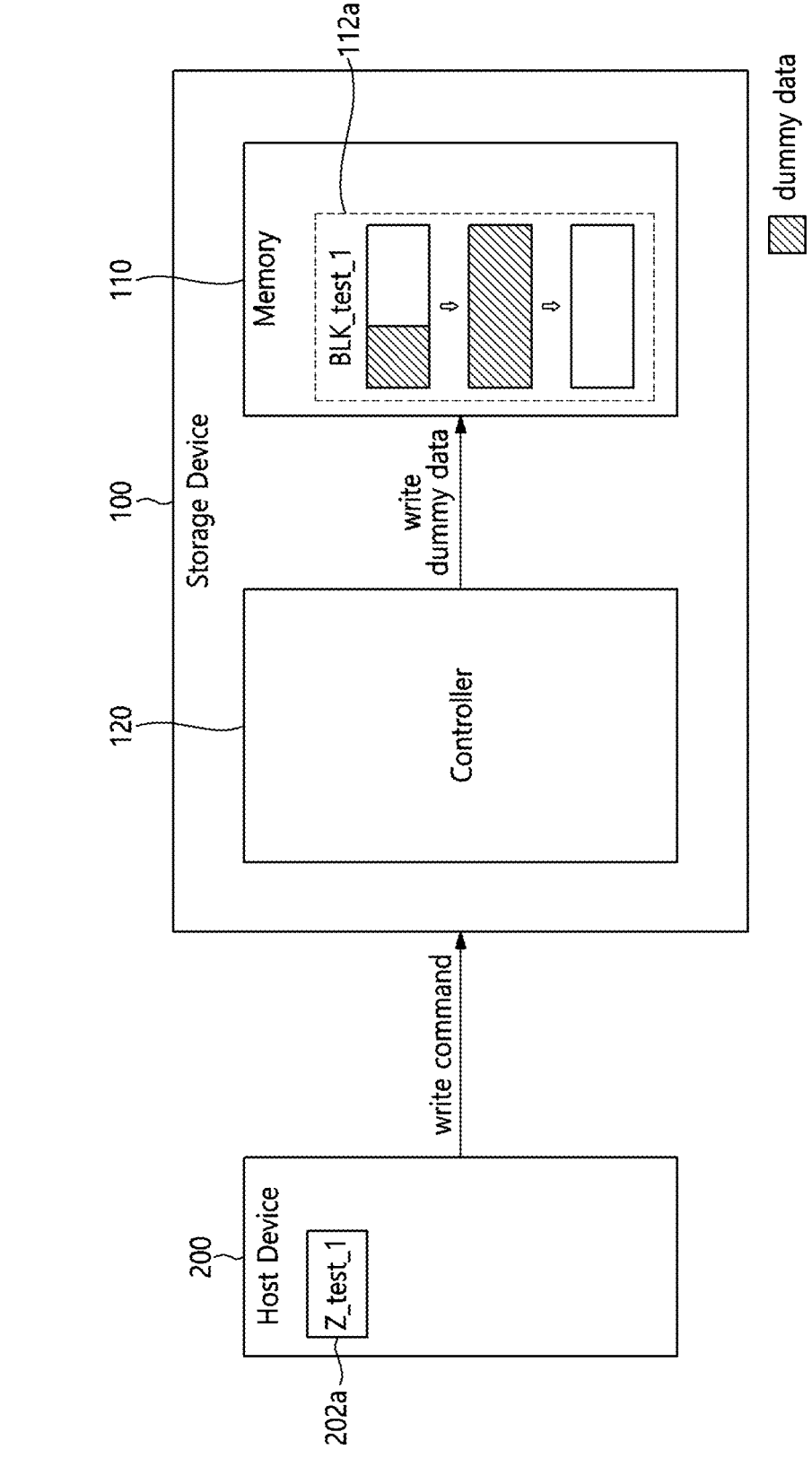
FIG. 4 is a diagram illustrating writing of data to a test storage block in a storage device according to an embodiment of the disclosure.

FIG. 4 is a diagram illustrating writing of data to a test storage block in a storage device according to an embodiment of the disclosure.

Referring to FIG. 4, a host device 200 sets a first test zone 202a with a smaller size than a previously set normal zone 201. After setting the first test zone 202a, the host device 200 may request a storage device 100 to allocate a storage block corresponding to the first test zone 202a.

The controller 120 may allocate a first test storage block 112a corresponding to the first test zone 202a.

To measure performance, the host device 200 may transmit to the storage device 100 a command that requests to write dummy data to the first test storage block 112a. In the present specification, data written to a normal storage block 111 may be referred to as user data, and data written to a test storage block 112 may be referred to as dummy data.

When receiving a write command, the controller 120 may write dummy data according to the write command to the first test storage block 112a.

For example, when receiving a write command from the host device 200, the controller 120 may transmit a response signal to the host device 200. The controller 120 may write dummy data received in response to the response signal to the first test storage block 112a. The controller 120 may transmit a response signal according to completion of the write operation to the host device 200.

The host device 200 may measure the operating performance of the storage device 100 on the basis of the response signal received from the storage device 100. For example, the host device 200 may measure the operating performance of the storage device 100 on the basis of the amount of time until the response signal corresponding to the write command, or the response signal according to the completion of the write operation, is received.

The host device 200 may measure operating performance by comparing the time using the test storage block 112 with a time required to write data of the same size as the dummy data to the existing normal storage block 111. For example, a time required when writing data of x MB size to the normal storage block 111 of the first size can be compared to a time required when writing the data of x MB size to the test storage block 112 of the second size, and the host device 200 may use the result to measure or predict performance, and for determining whether to set the size of a normal zone 201 to the second size.

The controller 120 may write the dummy data according to the write command of the host device 200 for the first test storage block 112a. When the dummy data is written to the entire region of the first test storage block 112a, the controller 120 may perform an operation of deleting the dummy data written to the first test storage block 112a. The controller 120 may delete the dummy data immediately after the dummy data is written to the entire region of the first test storage block 112a or may delete the dummy data after a predetermined time elapses.

In some embodiments, the controller 120 may control whether to delete the dummy data written to the first test storage block 112a and used for a test. For example, the controller 120 may ignore or not receive a deletion request of the host device 200, and observe a state in which the dummy data is written to the first test storage block 112a.

In other embodiments, the controller 120 may receive a deletion request from the host device 200 and delete the dummy data written to the first test storage block 112a.

In further embodiments, the controller 120 may delete the dummy data written to the first test storage block 112a on the basis of a new write command received from the host device 200.

For example, the controller 120 may receive a write command from the host device 200 in a state in which the dummy data is written to at least a partial region of the first test storage block 112a. When the dummy data is already written to a region to which writing is requested by the host device 200, the controller 120 may delete the previously written dummy data and write new dummy data according to the new write command of the host device 200 to the first test storage block 112a.

Even after deleting the dummy data written to the first test storage block 112a, the controller 120 may maintain the allocation state of the first test storage block 112a. Until a deallocation request for the first test storage block 112a is received from the host device 200, the controller 120 may maintain the allocation state while fixing the physical location of the first test storage block 112a.

Through the write operation on the first test storage block 112a, the host device 200 may measure the operating performance of the storage device 100 and determine whether to change the size of a normal zone 201.

The host device 200 may determine whether to change the size of a normal zone 201, on the basis of a read operation on the dummy data written to the first test storage block 112a.

Figure 5:
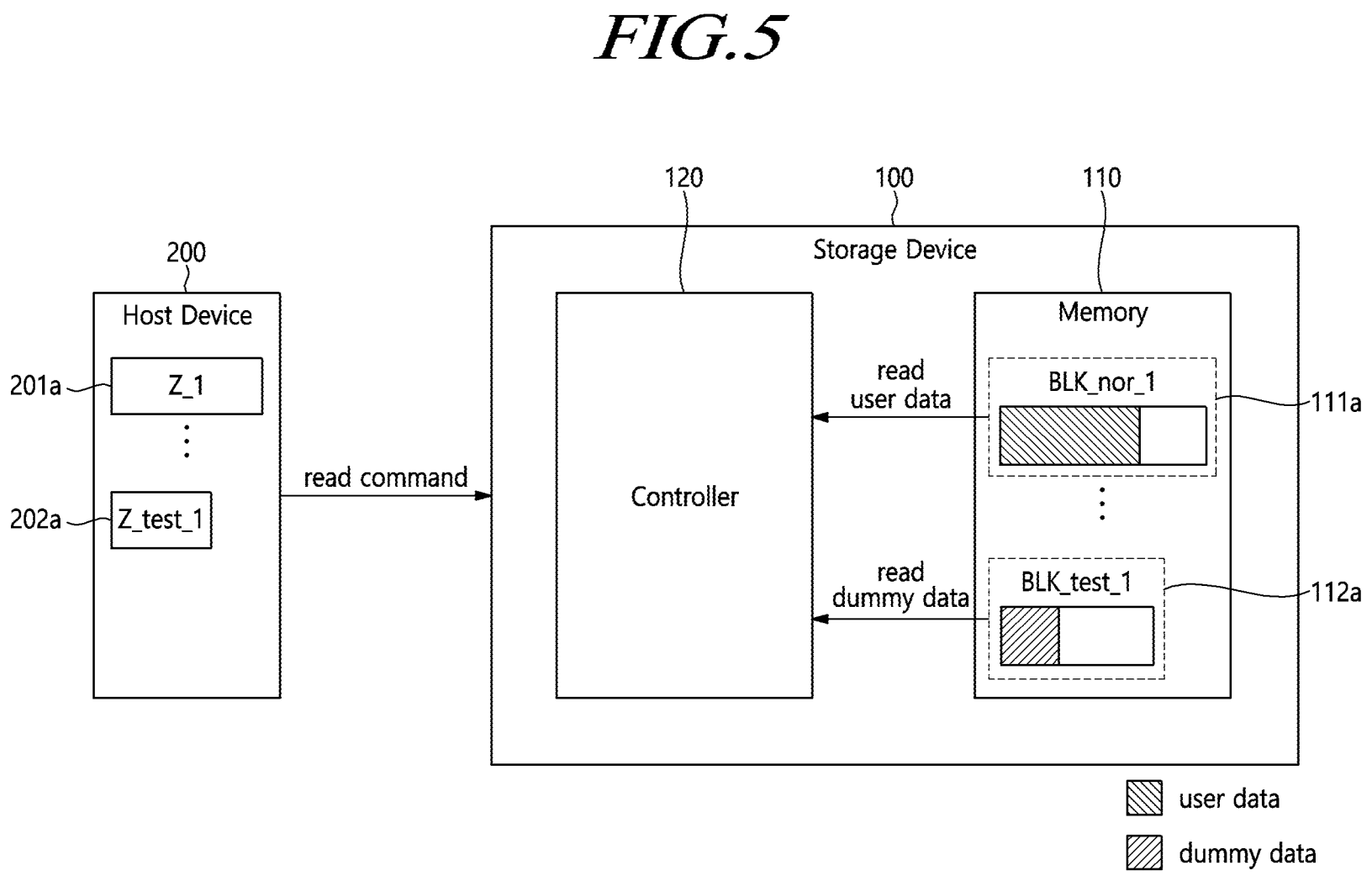

FIG. 5 is a diagram illustrating reading of data of a test storage block in a storage device according to an embodiment of the disclosure.

Referring to FIG. 5, a first normal zone 201a and a first test zone 202a are set by the host device 200.

The controller 120 may allocate, in the memory 110, a first normal storage block 111a corresponding to the first normal zone 201a and a first test storage block 112a corresponding to the first test zone 202a.

User data may be written to the first normal storage block 111a. Dummy data may be written to the first test storage block 112a.

According to a read command from the host device 200, data written to the first normal storage block 111a or the first test storage block 112a may be read. The host device 200 may or may not perform an operation of reading the user data written to the first normal storage block 111a while performing a test with the first test storage block 112a.

According to the read command from the host device 200, the controller 120 may perform an operation of reading the dummy data written to the first test storage block 112a. The controller 120 may read the dummy data written to the first test storage block 112a and provide the read dummy data to the host device 200.

The operation in which the controller 120 reads the dummy data written to the first test storage block 112a and provides the read dummy data to the host device 200 may be different from an operation in which the controller 120 reads the user data written to the first normal storage block 111a and provides the read user data to the host device 200.

For example, when an error is detected while reading the dummy data written to the first test storage block 112a, the controller 120 may not correct at least a part of the detected error. When an error is detected while reading the user data written to the first normal storage block 111a, the controller 120 may perform an operation of correcting the detected error. The controller 120 may provide the error-corrected user data to the host device 200. When an uncorrectable error is found, the controller 120 may provide that corresponding information to the host device 200.

When providing the dummy data to the host device 200, the controller 120 may provide the dummy data with an error that is not corrected to the host device 200, and may provide only information on the detected error to the host device 200. The host device 200 may measure performance using the first test storage block 112a, based on the response time to the read command and the information provided about the detected error, and determine whether to change the size of a normal zone 201.

The controller 120 may perform a read retry operation to be performed when a read operation fails in a manner that depends on the type of storage block.

For example, the number of read retry operations that the controller 120 performs when a read operation on the first test storage block 112a fails may be smaller than the number of read retry operations that the controller 120 performs when a read operation on the first normal storage block 111a fails. The size or number of read retry tables that are used in a read retry operation on the first test storage block 112a may be smaller than the size or number of read retry tables that are used in a read retry operation on the first normal storage block 111a.

The controller 120 may reduce the time set for a read retry operation on the first test storage block 112a and provide the setting information of the read retry operation to the host device 200. Using the setting information of the read retry operation on the first test storage block 112a, the number of detected errors, etc., the host device 200 may predict a time required for a read operation if the size of the normal storage block 111 is changed to the size of the test storage block 112. Using this predicted information, the host device 200 may determine whether to change the size of a normal zone 201 to the size of the test zone 202.

The controller 120 may perform a background operation while performance measurement by the host device 200 is in progress. When performing the background operation, the controller 120 may exclude the test storage block 112 as a target of the background operation.

Figure 6:
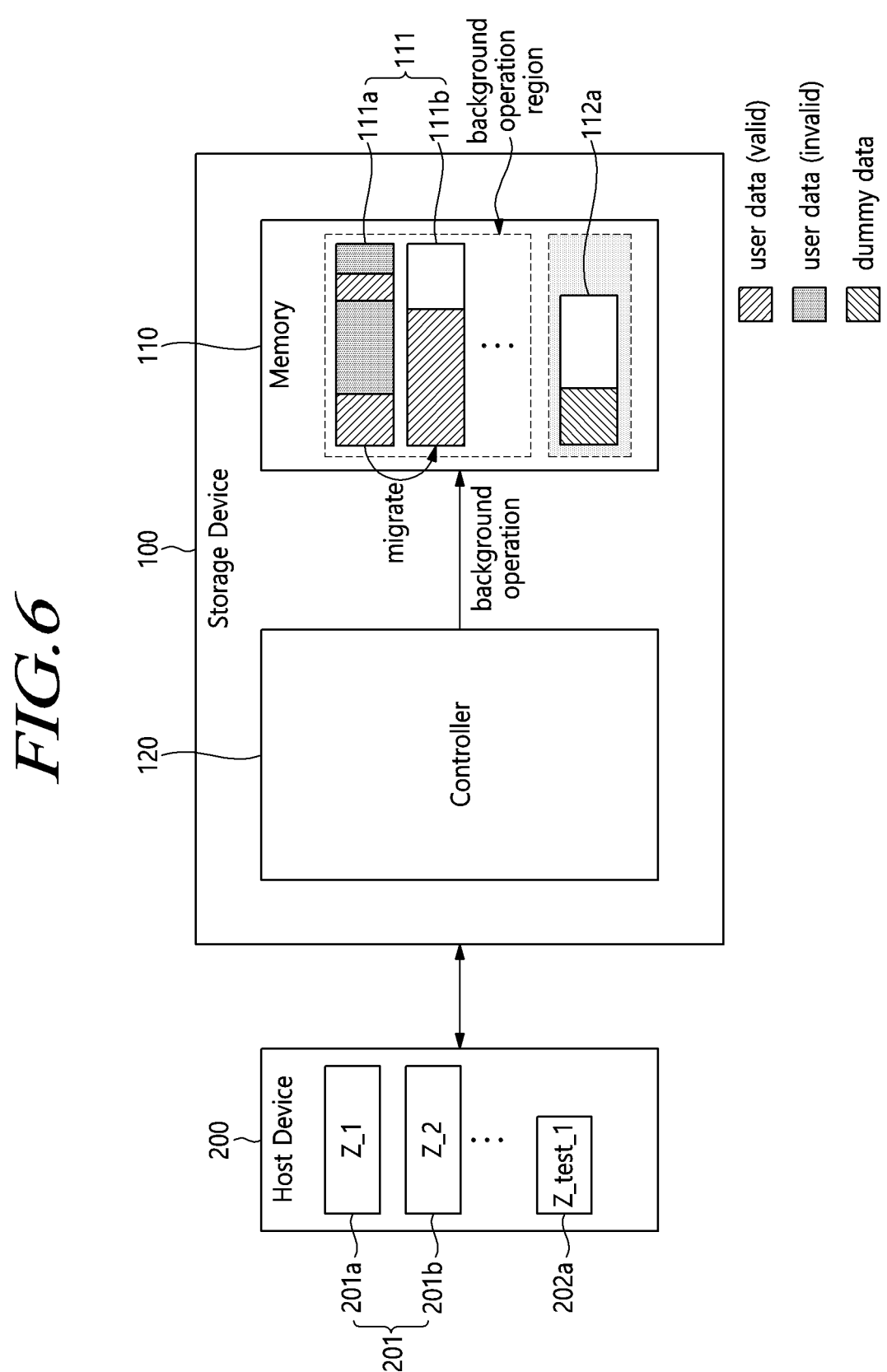
FIG. 6 is a diagram illustrating performance of a background operation in a storage device according to an embodiment of the disclosure.

FIG. 6 is a diagram illustrating performance of a background operation in a storage device according to an embodiment of the disclosure.

Referring to FIG. 6, a first normal zone 201a and a second normal zone 201b may be set by the host device 200. A first test zone 202a may be set by the host device 200. The size of the first test zone 202a may be different from the size of the first normal zone 201a and the second normal zone 201b.

For example, the first test zone 202a may have a smaller size than the first normal zone 201a and the second normal zone 201b.

The controller 120 may allocate a first normal storage block 111a and a second normal storage block 111b corresponding to the first normal zone 201a and the second normal zone 201b, respectively. The controller 120 may allocate a first test storage block 112a corresponding to the first test zone 202a.

According to a command from the host device 200, the controller 120 may control an operation of writing dummy data to the first test storage block 112a or reading dummy data from the first test storage block 112a.

While the allocation state of the first test storage block 112a is maintained, the controller 120 may perform a background operation on at least some of the other storage blocks included in the memory 110. As in the example described above, a background operation may be at least one among garbage collection, wear leveling, read reclaim and bad block management operations.

For example, during a garbage collection or read reclaim operation, data written to some storage blocks may be copied to other storage blocks according to the kind of background operation.

For example, during a garbage collection operation, data of a victim storage block may be copied to a target storage block. During a read reclaim operation, data of a storage block with a read count equal to or greater than a preset count may be copied to another storage block.

When performing a background operation, the controller 120 may exclude the first test storage block 112a from the background operation. Thus, when performing the background operation, the controller 120 may copy user data of at least one normal storage block 111 to another normal storage block 111 while excluding the first test storage block 112a.

For example, the controller 120 may copy valid user data, from among user data written to the first normal storage block 111a, to the second normal storage block 111b.

While the background operation is performed by the controller 120, the first test storage block 112a may maintain a physically fixed location. The first test storage block 112a may be excluded from the selection of a target for a background operation or be excluded as a target on which a background operation is to be performed. Thus, performance measurement by the host device 200 may be performed using the first test storage block 112a while the allocation state of the first test storage block 112a is maintained until a deallocation request by the host device 200 is received.

The controller 120 may perform a background operation on a storage block other than the first test storage block 112a while the first test storage block 112a is in an allocated state, thereby maintaining and improving the performance of the memory 110.

Depending on the type of dummy data provided by the host device 200, the dummy data may be written to the memory 110 or may not be written to the memory 110. When the dummy data is a type that is not written to the memory 110, performance measurement by the host device 200 may be performed without the dummy data being written to the test storage block 112 of the memory 110.

Figure 7:
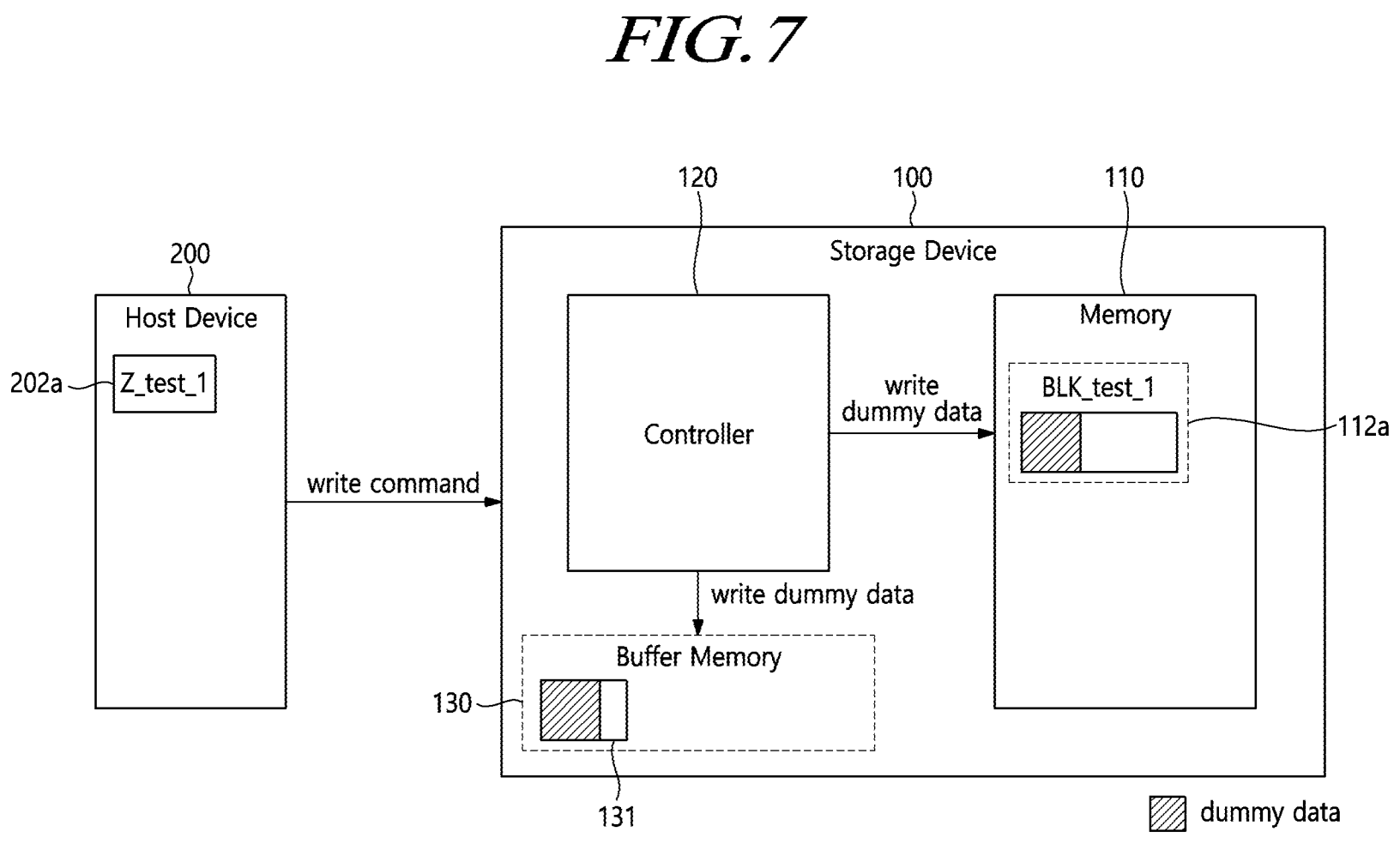

FIG. 7 is a diagram illustrating another writing of dummy data for a test in a storage device according to an embodiment of the disclosure.

Referring to FIG. 7, a storage device 100 may include a buffer memory 130. The buffer memory 130 may be a volatile memory. The buffer memory 130 may be located outside the controller 120, but in other embodiments, the buffer memory 130 may be located inside the controller 120. The buffer memory 130 may include a plurality of buffer blocks 131.

In FIG. 7, a first test storage block 112*a* of the memory 110 may be allocated to correspond to a first test zone 202*a* set by the host device 200.

The controller 120 may write dummy data according to a write command from the host device 200 to the allocated first test storage block 112*a*. The controller 120 may write at least a part of the dummy data according to a write command from the host device 200 to a buffer block 131 of the buffer memory 130.

Data written to the storage device 100 by the host device 200, may include data written to the memory 110 as well as data written only to the buffer memory 130 but not written to the memory 110. When the host device 200 writes dummy data to the first test storage block 112*a*, the dummy data may include a type of dummy data written only to the buffer memory 130, and a type of dummy data written only to the buffer block 131 of the buffer memory 130.

The controller 120 may write dummy data to the buffer memory 130, and in response to a command from the host device 200, the host device 200 may measure the performance of the storage device 100 on the basis of a response according to the completion of an operation using the dummy data written to the buffer memory 130.

By comparing performance when a part of dummy data according to a write command from the host device 200 is written to the memory 110 and the other part is written to the buffer memory 130 with performance in which user data is used, performance according to the test storage block 112 may be measured.

The controller 120 may control the allocation of the test storage block 112 and write and read operations according to requests from the host device 200, and may deallocate the test storage block 112 according to a request from the host device 200.

Figure 8A:
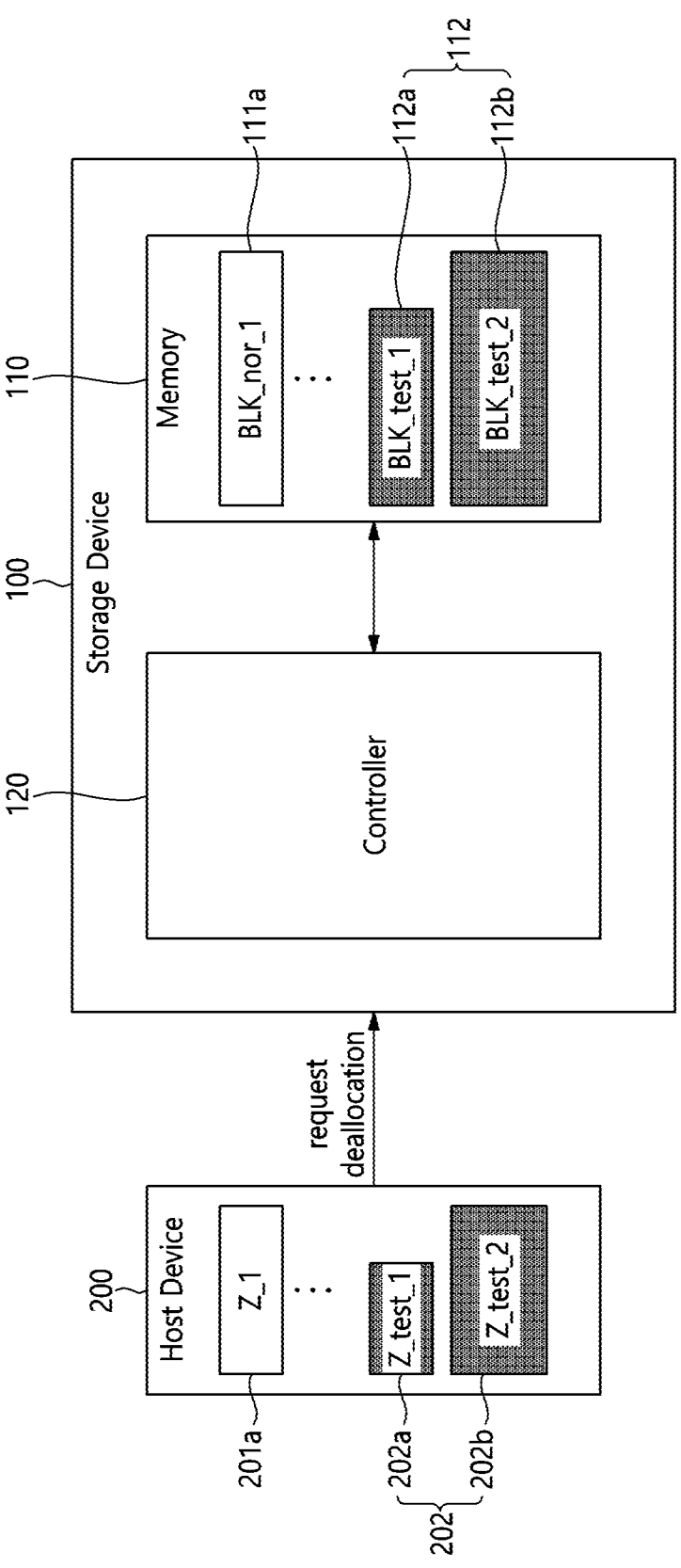
FIGS. 8A and 8B are diagrams illustrating deallocation of a test storage block in a storage device according to an embodiment of the disclosure.
Figure 8B:
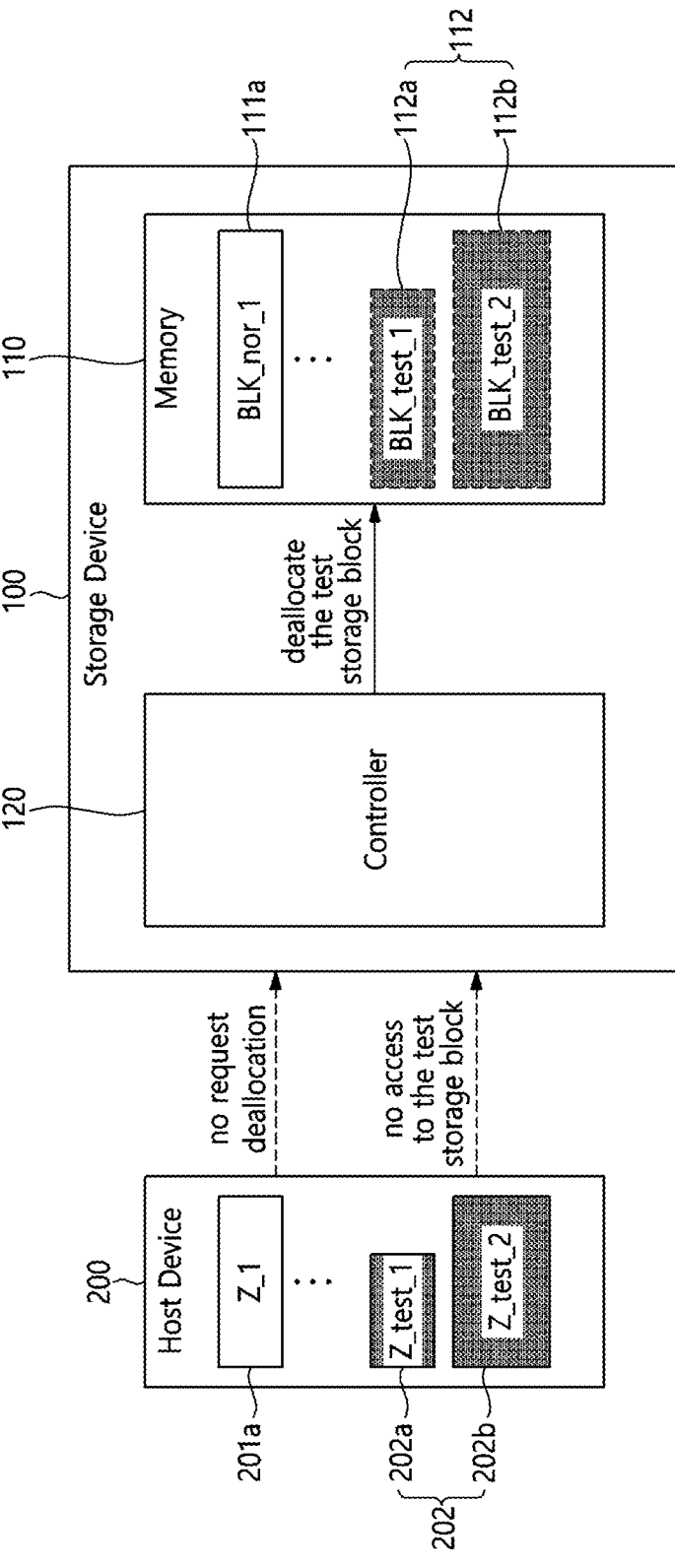

FIGS. 8A and 8B are diagrams illustrating deallocation of a test storage block in a storage device according to an embodiment of the disclosure.

Referring to FIG. 8A, a first test zone 202*a* may be set by the host device 200. In correspondence to the first test zone 202*a*, a first test storage block 112*a* of the memory 110 may be allocated.

A second test zone 202*b* may be set by the host device 200, and in correspondence to the second test zone 202*b*, a second test storage block 112*b* of the memory 110 may be allocated.

The first test storage block 112*a* and the second test storage block 112*b* may be allocated during periods in which separate tests are in progress, or may be allocated simultaneously or sequentially during a period in which the same test is in progress.

When measurement of the performance of the storage device 100 based on the test zone 202 is completed, the host device 200 may cancel the setting of the test zone 202. The host device 200 may request the storage device 100 to deallocate the test storage block 112.

When receiving the deallocation request from the host device 200, the controller 120 may deallocate the test storage block 112.

The test storage block 112 deallocated by the controller 120 may become a free storage block. As the test storage block 112 is changed to a free storage block, the free storage block may be allocated as a new normal storage block 111 according to an allocation request from the host device 200.

In this way, the controller 120 may maintain the allocation state of the test storage block 112 until a deallocation request for the test storage block 112 is received from the host device 200. The controller 120 may deallocate the test storage block 112 according to the deallocation request from the host device 200.

In an embodiment, the controller 120 may deallocate the test storage block 112 when a sudden power-off occurs after allocation of the test storage block 112.

For example, a sudden power-off may occur after allocation of the test storage block 112. The controller 120 may perform an operation for recovering the sudden power-off. As the sudden power-off is recovered by the controller 120, booting of the storage device 100 may be performed. Upon booting of the storage device 100, the controller 120 may deallocate the test storage block 112.

In an embodiment, the controller 120 may deallocate the test storage block 112 without receiving a deallocation request from the host device 200.

In addition, referring to FIG. 8B, the controller 120 may deallocate the test storage block 112 when access to the test storage block 112 does not occur for a predetermined period of time.

The controller 120 may maintain the allocation state of the test storage block 112 until receiving a deallocation request from the host device 200, and when an access to the test storage block 112 by the host device 200 does not occur for a period of time exceeding a preset time, may deallocate the test storage block 112 and change the test storage block 112 to a free storage block.

According to a new allocation request from the host device 200, the controller 120 may allocate a normal storage block 111 from among storage blocks including the test storage block 112 that was previously changed to a free storage block.

Figure 9:
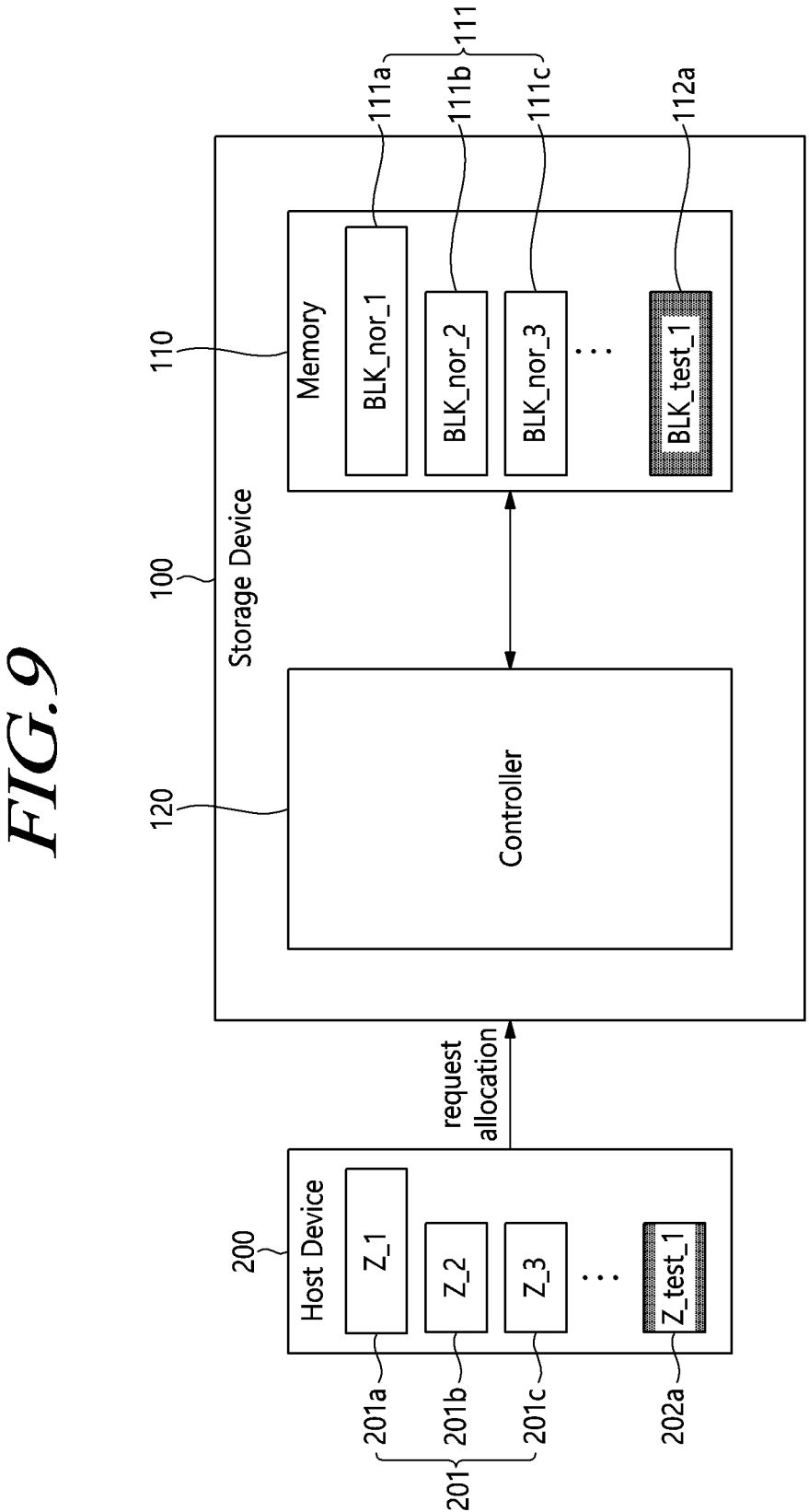
FIG. 9 is a diagram illustrating an allocation of a normal storage block after deallocating a test storage block in a storage device according to an embodiment of the disclosure.

FIG. 9 is a diagram illustrating allocation of a normal storage block after deallocating a test storage block in a storage device according to an embodiment of the disclosure.

Referring to FIG. 9, for example, a host device 200 may set a first normal zone 201*a* of a first size, and may request a storage device 100 to allocate a normal storage block 111 corresponding to the first normal zone 201*a*. The controller 120 may allocate a first normal storage block 111*a* corresponding to the first normal zone 201*a*.

The host device 200 may set a first test zone 202*a* of a second size different from the first size. The host device 200 may request the storage device 100 to allocate a test storage block corresponding to the first test zone 202*a*. The controller 120 may allocate a first test storage block 112*a* corresponding to the first test zone 202*a*.

The controller 120 may maintain the allocation state of the first test storage block 112*a* while a test by the host device 200 is performed.

Through performance measurement according to a write or read operation on the first test storage block 112*a*, the host device 200 may determine whether to change the size of a normal zone 201.

When performance measurement using the first test storage block 112*a* is completed, the host device 200 may cancel the setting of the first test zone 202*a*. The host device 200 may request the storage device 100 to deallocate the first test storage block 112*a*. According to the deallocation request of the host device 200, the storage device 100 may deallocate the first test storage block 112*a*.

In some embodiments, on the basis of a performance measurement test result, the host device 200 may determine whether to change the size of a normal zone 201. For example, the host device 200 may change the size of a normal zone 201 from the first size to the second size, which is the size of the first test zone 202*a*. The host device 200 may set a second normal zone 201*b* and a third normal zone 201*c* of the second size.

In other embodiments, when the result of the performance measurement based on the first test storage block 112*a* is not better than performance measured using the existing normal storage block 111, the host device 200 may maintain the size of a new normal zone 201, which is the first size, without change.

In yet other embodiments, the host device 200 may perform a test using a test zone 202 of the second size and a test zone 202 of a third size, and may change the size of a normal zone 201 to the second size or the third size.

When the host device 200 changes and sets the size of a normal zone 201 to the second size according to performance measurement test results, the host device 200 may request the storage device 100 to allocate normal storage blocks 111 corresponding to the second normal zone 201*b* and the third normal zone 201*c*, respectively.

According to the allocation request from the host device 200, the controller 120 of the storage device 100 may allocate a second normal storage block 111*b* and a third normal storage block 111*c* corresponding to the size of the second normal zone 201*b* and the third normal zone 201*c*, respectively.

The controller 120 may allocate a new normal storage block 111 including at least a part of the deallocated first test storage block 112*a*. Alternatively, the controller 120 may allocate the deallocated first test storage block 112*a* as a new normal storage block 111.

The controller 120 may maintain the first normal storage block 111*a* having a size different from that of the second normal storage block 111*b* and the third normal storage block 111*c*. Alternatively, the controller 120 may copy only valid user data, from among user data written to the first normal storage block 111*a*, to another normal storage block 111, thereby managing only the valid user data. The size of the other normal storage block 111 may be the same as the size of the second normal storage block 111*b* and the third normal storage block 111*c*. The operation of copying the user data written to the first normal storage block 111*a* may be performed according to a request from the host device 200.

In some embodiments, the storage device 100 may receive a deallocation request for the first test storage block 112*a*, and may allocate a normal storage block 111 with a changed size according to an allocation request for a normal storage block 111 from the host device 200.

In other embodiments, the storage device 100 may receive an allocation request for a new normal storage block 111 without receiving a deallocation request for the first test storage block 112*a* from the host device 200.

When receiving an allocation request for a normal storage block 111 set to a size different from the size of the existing normal storage block 111, the controller 120 may allocate a normal storage block 111 according to the corresponding allocation request, and then, may deallocate the first test storage block 112*a*. The controller 120 may determine that a test for setting the size of a zone of the host device 200 has been completed, and may deallocate the first test storage block 112*a*.

In this way, the controller 120 may deallocate the first test storage block 112*a* when receiving, from the host device

200, an allocation request for a normal storage block 111 that corresponds to a normal zone 201 of a new size.

Figure 10:
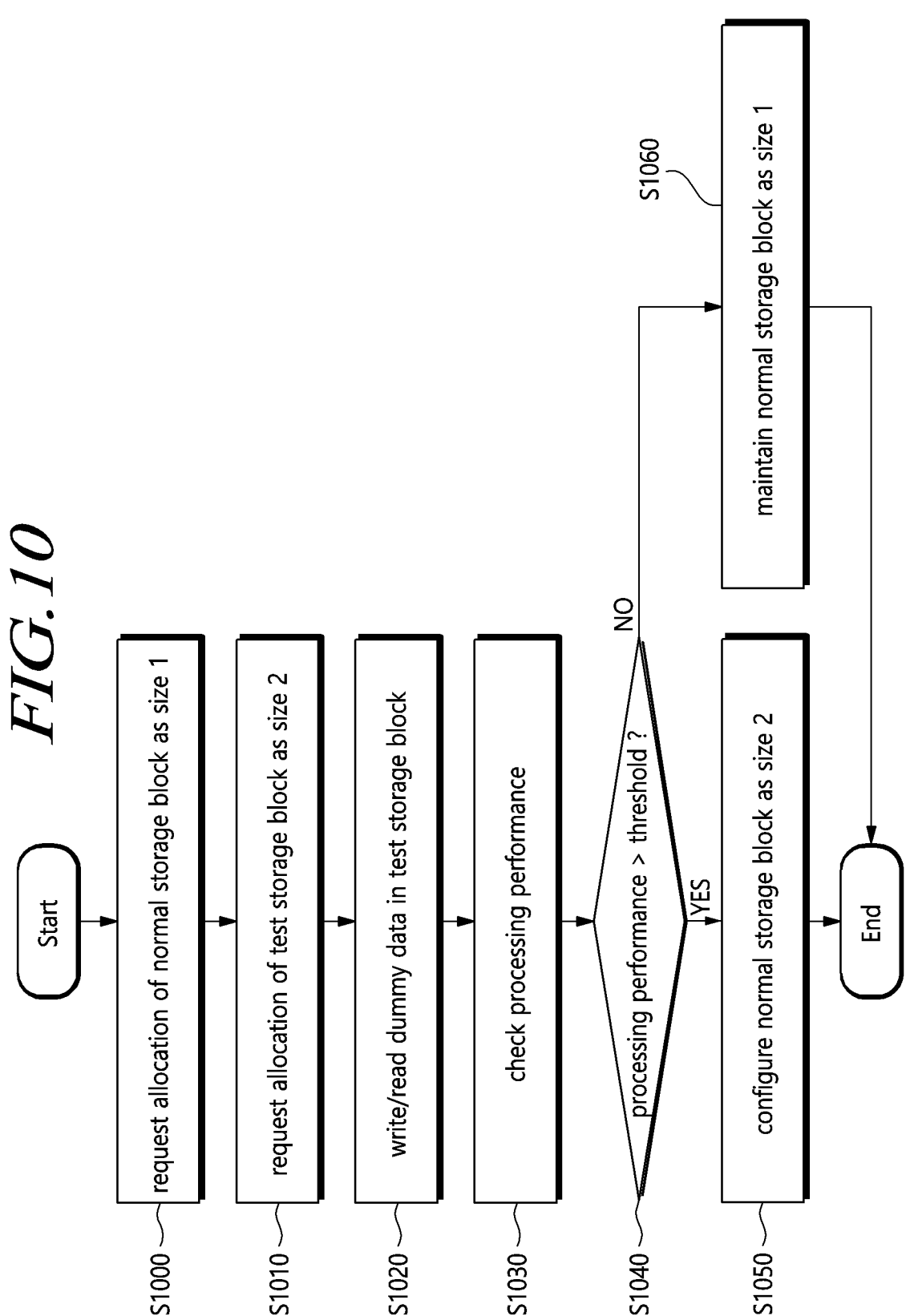
FIG. 10 is a diagram illustrating a method for operating a host device in a computing system according to an embodiment of the disclosure.

FIG. 10 is a diagram illustrating a method for operating a host device in a computing system according to an embodiment of the disclosure.

Referring to FIG. 10, a host device 200 may request a storage device 100 to allocate a normal storage block 111 of a first size (S1000).

The host device 200 may request the storage device 100 to allocate a test storage block 112 of a second size (S1010).

The host device 200 may transmit, to the storage device 100, a command to write dummy data to the allocated test storage block 112 or to read dummy data written to the allocated test storage block 112 (S1020).

The host device 200 may measure performance according to the performance of an operation on the test storage block 112 (S1030). The host device 200 may check whether the measured performance is greater than a preset threshold (S1040).

When the measured performance is greater than the preset threshold, the host device 200 may set the size of a normal storage block 111 to the second size, which is the size of the test storage block 112 (S1050). When the measured performance is equal to or less than the preset threshold, the host device 200 may maintain the size of a normal storage block 111 to the first size, which is the size of the existing normal storage block 111 (S1060).

In this way, through performance measurement based on a test zone 202 and the test storage block 112 corresponding to the test zone 202, the host device 200 may set a normal storage block 111 of a size capable of improving data processing performance using the storage device 100.

The storage device 100 may support allocation of the test storage block 112 for performance measurement by the host device 200.

Figure 11:
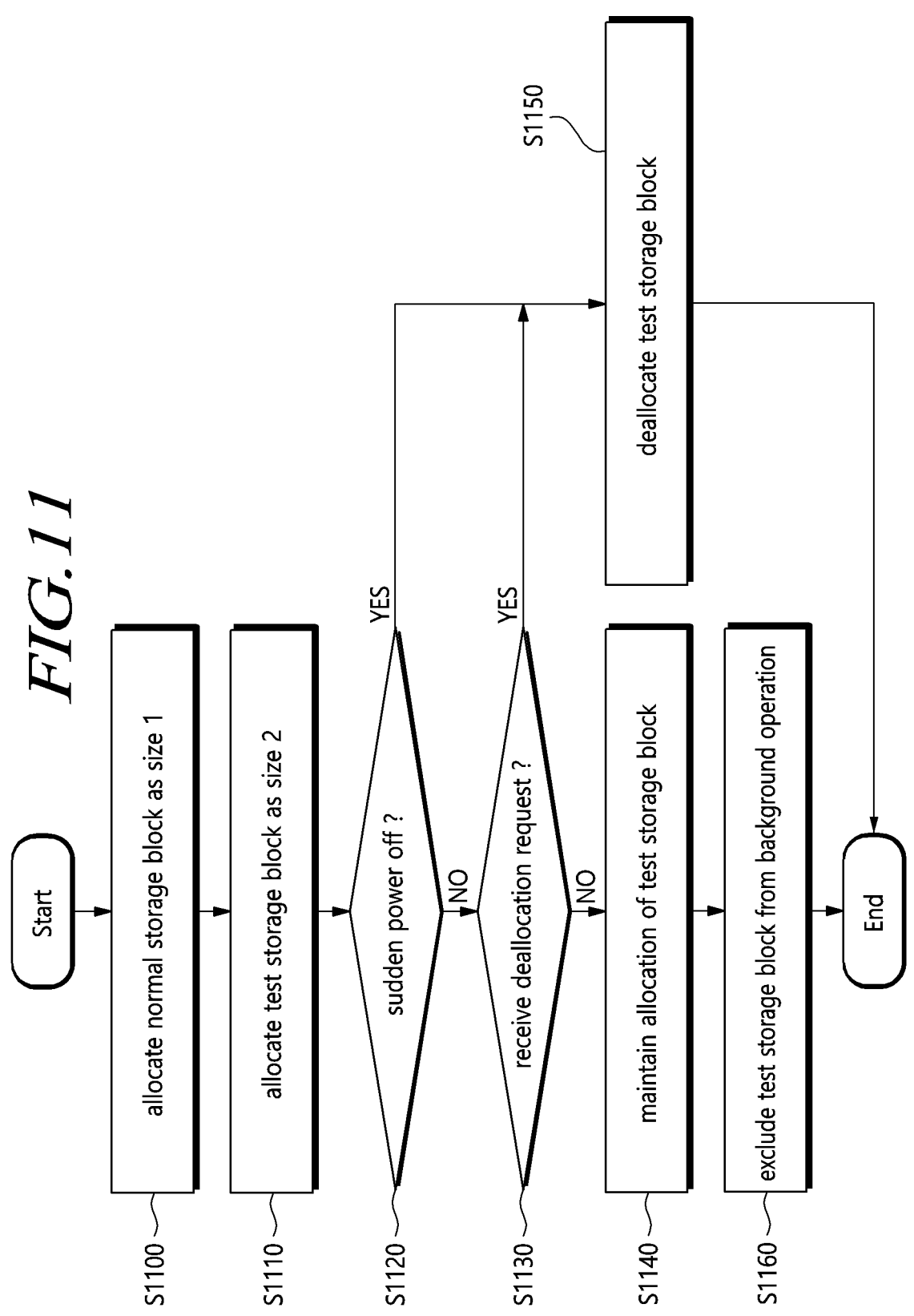
FIG. 11 is a diagram illustrating a method for operating a storage device in a computing system according to an embodiment of the disclosure.

FIG. 11 is a diagram illustrating a method for operating a storage device in a computing system according to an embodiment of the disclosure.

Referring to FIG. 11, a storage device 100 may allocate a normal storage block 111 of a first size according to a request from a host device 200 (S1100).

The storage device 100 may allocate a test storage block 112 of a second size according to a request from the host device 200 (S1110).

The storage device 100 may check whether a sudden power-off occurs (S1120). When a sudden power-off occurs, the storage device 100 may deallocate the test storage block 112 upon booting after recovery (S1150).

When a sudden power-off does not occur, the storage device 100 may check whether a request for deallocating the test storage block 112 is received from the host device 200 (S1130). When a deallocation request is received from the host device 200, the storage device 100 may deallocate the test storage block 112 (S1150).

The storage device 100 may maintain the allocation state of the test storage block 112 until a deallocation request from the host device 200 is received (S1140).

The storage device 100 may support performance measurement by the host device 200 using the test storage block 112 while maintaining the allocation state of the test storage block 112. The storage device 100 may maintain the test storage block 112 at a physically fixed location, and may exclude the test storage block 112 from being a target of a background operation (S1160).

The storage device 100 may maintain and improve the performance of the memory 110 through a background operation, and by excluding the test storage block 112 from a background operation and maintaining the allocation state of the test storage block 112, may support performance measurement by the host device 200 to be performed.

Although various embodiments of the disclosed technology have been described with particular specifics and varying details for illustrative purposes, those skilled in the art will appreciate that various modifications, additions and substitutions may be made based on what is disclosed or illustrated in the disclosed technology without departing from the spirit and scope of the disclosed technology as defined in the following claims.

What is claimed is:

1. A storage device comprising:

at least one memory including a plurality of storage blocks; and a controller configured to allocate a first normal storage block of a first size in response to a first allocation request from a host device and to write valid user data to the first normal storage block, allocate a test storage block of a second size different from the first size in response to a second allocation request from the host device, during a period when the first normal storage block of the first size is allocated, and write invalid dummy data to the test storage block, wherein the invalid dummy data is deleted without a request from the host device, and allocate a second normal storage block of a third size, which is the same as the first size or the second size, in response to a third allocation request from the host device, wherein the third allocation request is based on a measured performance of the test storage block.

2. The storage device according to claim 1, wherein the controller maintains an allocation state of the test storage block until receiving a deallocation request for the test storage block from the host device.

3. The storage device according to claim 1, wherein the controller deallocates the test storage block upon booting after a sudden power-off occurs.

4. The storage device according to claim 1, wherein the controller receives a deallocation request for the test storage block from the host device before receiving the third allocation request.

5. The storage device according to claim 1, wherein the controller performs at least one of a write operation or a read operation on the test storage block before receiving the third allocation request.

6. The storage device according to claim 1, wherein the controller writes the invalid dummy data to the test storage block according to a write command received from the host device, and when the invalid dummy data is written to an entire region of the test storage block, deletes the invalid dummy data written to the test storage block at a preset time.

7. The storage device according to claim 6, wherein when receiving a new write command for the test storage block from the host device before the preset time, the controller deletes the invalid dummy data written to the test storage block, and writes new invalid dummy data to the test storage block according to the new write command.

8. The storage device according to claim 6, wherein the controller maintains an allocation state of the test storage block after deleting the invalid dummy data.

9. The storage device according to claim 6, further comprising:

at least one buffer memory including a plurality of buffer blocks, wherein the controller writes at least a part of the invalid dummy data to at least a part of the plurality of buffer blocks.

10. The storage device according to claim 1, wherein the controller reads the invalid dummy data written to the test storage block and provides the read invalid dummy data to the host device according to a read command received from the host device, and when an error is detected while reading the invalid dummy data, provides the read invalid dummy data to the host device without correcting the error.

11. The storage device according to claim 1, wherein when performing a background operation on at least a part of the plurality of storage blocks, the controller excludes the test storage block from the background operation.

12. A storage device comprising:

at least one memory including a plurality of storage blocks; and a controller configured to allocate a first normal storage block of a first size in response to a first allocation request from a host device and to write valid user data to the first normal storage block, and allocate a test storage block of a second size different from the first size in response to a second allocation request from the host device, during a period when the first normal storage block of the first size is allocated, and write invalid dummy data to the test storage block, wherein the invalid dummy data is deleted without a request from the host device, the test storage block being excluded from a background operation, and wherein the controller allocates a second normal storage block of a third size, which is the same as the first size or the second size, in response to a third allocation request from the host device, the third allocation request is based on a measured performance of the test storage block.

13. The storage device according to claim 12, wherein the controller receives a deallocation request for the test storage block from the host device before receiving the third allocation request, and maintains an allocation state of the test storage block until the deallocation request is received.

14. The storage device according to claim 12, wherein when performing the background operation, the controller copies user data written to at least one of remaining storage blocks, except the test storage block, from among the plurality of storage blocks to another one of the remaining storage blocks.

15. A computing system comprising:

a storage device including a plurality of storage blocks; and a host device configured to transmit, to the storage device, a first allocation request requesting allocation of a normal storage block of a first size and a first write command requesting for writing valid user data to the normal storage block of the first size, and transmit, to the storage device, a second allocation request requesting allocation of a test storage block of a second size different from the first size during a period when the normal storage block of the first size is allocated, and a second write command that requests writing invalid dummy data to the test storage block, wherein the invalid dummy data is deleted without a request from the host device, and wherein the host device transmits, to the storage device, a third allocation request requesting allocation of a normal storage block of a third size, which is the same as the first size or the second size, and the third allocation request is based on a measured performance of the test storage block.

16. The computing system according to claim 15, wherein the host device transmits a deallocation request for the test storage block to the storage device before transmitting the third allocation request.

17. The computing system according to claim 16, wherein the storage device maintains an allocation state of the test storage block until the deallocation request for the test storage block is received from the host device.

18. The computing system according to claim 15, wherein when performing a background operation on at least a part of the plurality of storage blocks, the storage device excludes the test storage block from the background operation.

* * * * *